(12) United States Patent
Ono (10) Patent No.: US 8,980,156 B2
(45) Date of Patent: Mar. 17, 2015

(54) SYSTEM AND METHOD FOR MAKING GOLF BALLS

(75) Inventor: Takahisa Ono, Fujisawa (JP)

(73) Assignee: Nike, Inc., Beaverton, OR (US)

( * ) Notice: Subject to any disclaimer, the term of this patent is extended or adjusted under 35 U.S.C. 154(b) by 332 days.

(21) Appl. No.: 13/403,807

(22) Filed: Feb. 23, 2012

(65) Prior Publication Data

US 2013/0221577 A1    Aug. 29, 2013

(51) Int. Cl.
*B29C 59/16* (2006.01)

(52) U.S. Cl.
USPC ............................ 264/400; 264/139; 264/156

(58) Field of Classification Search
CPC .. B23K 26/0087; B23K 26/08; B23K 26/385; B23K 26/4065; B29C 2045/0058
USPC .......................................... 264/400, 139, 156
See application file for complete search history.

(56) References Cited

U.S. PATENT DOCUMENTS

| | | | |
|---|---|---|---|
| 6,248,974 B1 * | 6/2001 | Wai ........................... | 219/121.69 |
| 2008/0237189 A1 * | 10/2008 | Grunewald et al. ............ | 216/94 |
| 2011/0009215 A1 | 1/2011 | Ichikawa | |
| 2012/0137769 A1 | 6/2012 | Fitchett | |

\* cited by examiner

*Primary Examiner* — James Sanders
(74) *Attorney, Agent, or Firm* — Quinn Law Group, PLLC.

(57) ABSTRACT

A system and method for making golf balls is disclosed. The system may include laser cutting dimples into a golf ball cover layer. Laser cutting may also be used to add texture to the surface of a golf ball. Laser cutting dimples may provide flexibility in quickly creating different shapes, sizes, and patterns of dimples. Thus, during golf ball testing, a certain pattern of dimples may be made, tested, and then quickly adjusted. For example, the dimples may be adjusted by cutting away more cover material to make the dimples larger, deeper, and/or in a different shape. After further testing, the golf ball dimples may be adjusted again multiple times.

14 Claims, 5 Drawing Sheets

SYSTEM AND METHOD FOR MAKING GOLF BALLS

BACKGROUND

The present invention relates generally to a system and method for making a golf ball. In particular, the system and method relates to making golf ball dimples.

The game of golf is an increasingly popular sport at both amateur and professional levels. A wide range of technologies related to the manufacture and design of golf balls are known in the art. For instance, a method of manufacturing golf balls involves forming dimples on the balls by placing the balls into hemispherical molds having protrusions corresponding to dimples, injecting cover material inside the molds, and applying heat and pressure to the ball. This method applies a coating and forms dimples on the surface of the golf ball. While this method works well, it requires a mold to be made. Accordingly, making prototypes of golf balls with different dimple patterns can be time consuming. It would be advantageous to be able to make dimples on the surface of a golf ball without using a mold. It would also be advantageous to be able to adjust existing dimples on golf balls.

SUMMARY

A system and method for making golf balls is disclosed. The system may include laser cutting dimples into a golf ball cover layer. Laser cutting may also be used to add texture to the surface of a golf ball. Laser cutting dimples may provide flexibility in quickly creating different shapes, sizes, and patterns of dimples. Thus, during golf ball testing, a certain pattern of dimples may be made, tested, and then quickly adjusted. For example, the dimples may be adjusted by cutting away more cover material to make the dimples larger, deeper, and/or in a different shape. After further testing, the golf ball dimples may be adjusted again multiple times.

In one aspect the disclosure provides a method of making a multi-layered article. The method may include providing a base article and laser cutting material from an outer layer of the base article in a predetermined pattern. Laser cutting material from the outer layer may include not cutting material from any other layers of the article. The base article may include a base golf ball. The predetermined pattern may include one of a dimple pattern and a textured pattern. Laser cutting material from the surface of the base multi-layered article may include securing the multi-layered article to a workpiece holder. Laser cutting material from the outer layer of the base golf ball may include programming a computer numerical controller to cause a laser cutting system to remove material from the outer layer of the golf ball. Laser cutting material from the outer layer of the base golf ball may include programming a computer numerical controller to move the base golf ball relative to a laser head as the laser head cuts material from the outer layer of the base golf ball. Laser cutting material from the outer layer of the base golf ball may include programming a computer numerical controller to move the laser head relative to the base golf ball as the laser head cuts material from the outer layer of the base golf ball. Laser cutting material from the outer layer of the base golf ball may include moving the base golf ball relative to a laser head as the laser head cuts material from the outer surface of the base golf ball. Laser cutting material from the surface of the base golf ball may include moving a laser head relative to the base golf ball as the laser head cuts material from the outer surface of the base golf ball.

In another aspect, the disclosure provides a method of making a golf ball. The method may include forming a golf ball core, forming a golf ball cover surrounding the golf ball core, and laser cutting material from the golf ball cover in a predetermined pattern. Forming a golf ball cover surrounding the golf ball core may include placing the golf ball core between at least two mold chambers, pressing the at least two mold chambers together, and injecting a golf ball cover material into the mold chambers. The predetermined pattern may include a dimple pattern. The predetermined pattern may include a textured pattern. Laser cutting material from the surface of the base golf ball may include programming a computer numerical controller to move the base golf ball relative to a laser head as the laser head cuts material from the surface of the base golf ball.

In another aspect, the disclosure provides a system for making a golf ball. The system may include a laser head configured to emit a laser beam and to move in at least one direction, a workpiece holder configured to hold and move a golf ball in at least one direction, and a computer numerical controller configured to control movement between the laser head and the workpiece. The laser head may be configured to move in three axial directions. The workpiece holder may be configured to pivot in at least two directions. The workpiece holder may include a workpiece table having a holding portion configured to hold a golf ball. The laser head may include a yttrium lithium fluoride laser head. The system may include a user interface configured to enable a user to control the laser head.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

A system and method for making golf balls is disclosed. The system may include laser cutting patterns into a golf ball cover layer. For example, dimples and/or textured surfaces may be laser cut into a golf ball cover layer. During research and development of golf balls, prototype golf balls having various dimple patterns may be tested to determine which dimple patterns yield certain flight characteristics. Typically, golf ball dimples are formed by placing the golf balls into hemispherical mold chambers having protrusions corresponding to dimples. Cover material may be injected inside the mold chambers. Then, heat and pressure may be applied to the ball to mold the outside surface of the golf ball to have a shape corresponding to the inside surface of the mold chamber. Laser cutting dimples into golf balls may expedite the process of making prototype golf balls by eliminating the need for a dimple mold to be made. As a result, laser cutting may provide the ability to make various shapes, sizes, and/or patterns of dimples without the limitations presented by molds. For example, the molding process typically creates a flange, or flashing, in the space between two hemispherical molds pressed together. This flashing must be removed through buffing or other processes and the dimple patterns must be designed around the flashing. These restrictions imposed by the molding process may be eliminated by the disclosed laser cutting process.

Furthermore, laser cutting dimples may provide flexibility in quickly creating different shapes, sizes, and patterns of dimples. Thus, a certain pattern of dimples may be made, tested, and then quickly adjusted. For example, the dimples may be adjusted by cutting away more cover material to make the dimples larger, deeper, and/or in a different shape. After further testing, the golf ball dimples may be adjusted again multiple times. In some embodiments, laser cutting may be used to add texture to the surface of the golf ball. In some embodiments, laser cutting may add texture to the dimples and/or the and area between the dimples.

The disclosed method may include laser cutting patterns on any type of golf ball. For example, the method may include forming dimples on a golf ball not yet containing any dimples or forming additional dimples on a golf ball already containing dimples. In some embodiments, the method may include customizing a golf ball by adjusting dimples already existing on a golf ball. In some embodiments, the method may include forming dimples on testing golf balls used to test new aerodynamic patterns. For example, testing golf balls may include those described in U.S. patent application Ser. No. 12/958,843, entitled Systems and Methods for Evaluating a Golf Ball Design, applied for by Fitchett and filed on Dec. 2, 2010, the disclosure of which is hereby incorporated by reference in its entirety. In some embodiments, the method may include adding texture to the surface of a golf ball already containing dimples. The base golf ball upon which dimples are to be formed or adjusted may include any type of golf ball. Forming dimples on the base golf ball may be a finishing step. Forming dimples on the golf ball may be used to customize the golf ball. In some embodiments, the base golf ball may include a 1-piece, 2-piece, 3-piece, or 4-piece golf ball. In other embodiments, the base golf ball may include 5 or more layers. All of the layers of the golf ball may be formed by any suitable process. For example, a 2-piece golf ball may be formed by compression molding a golf ball core, placing the golf ball core between at least two mold chambers, pressing the at least two mold chambers together, and injecting a golf ball cover material into the mold chambers around the core. The base golf ball may be made of any suitable type of materials. For example, in some embodiments, the base golf ball may include a 2-piece golf ball having a resin core and a thermoplastic cover. The type of base golf ball and the materials used to form the base golf ball may be selected based on a variety of factors. For example, the type of base golf ball and the materials used to form the base golf ball may be selected based on the desired play characteristics of the base golf ball.

While the exemplary embodiments show the disclosed method being applied to golf balls, the disclosed method may be applied to any type of multi-layered article. The method may include laser cutting patterns on only an outer layer of any type of multi-layered article. In other words, the laser cutting only affects the outer layer of the multi-layered article.

Figure 1:
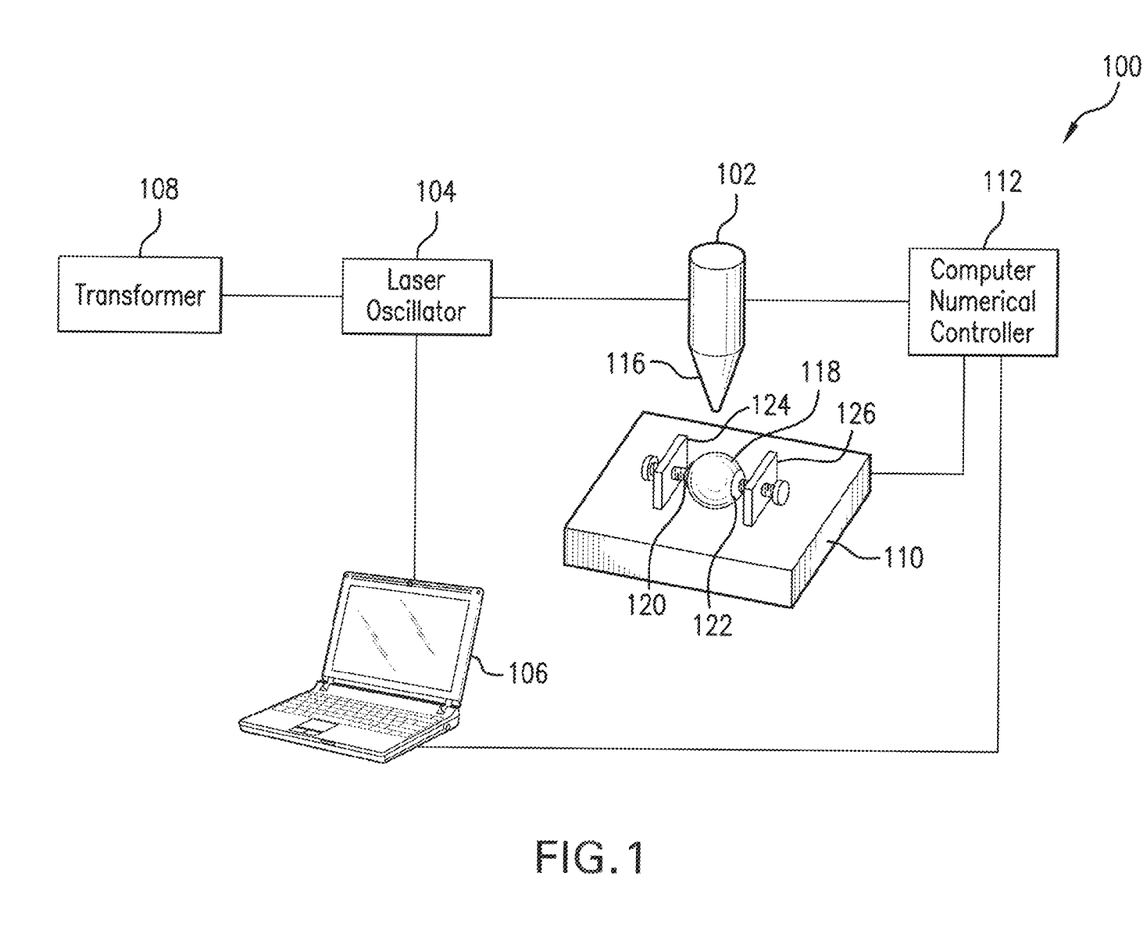
FIG. 1 is an exemplary system according to an embodiment.

FIG. 1 shows an embodiment of system for making dimples on the surface of a golf ball. The system may generally include a laser cutting machine 100 having a laser head, a workpiece holder configured to hold and/or move a workpiece, a movement system configured to provide motion between the laser head and the workpiece, and a computer numerical controller configured to control the movement between the laser head and the workpiece.

Laser cutting machine 100 may include any suitable type of laser cutting machine for cutting away golf ball material. For example, laser cutting machine 100 may include a pulse fiber laser, continuous wave carbon dioxide laser, ultraviolet solid state laser, yttrium lithium fluoride laser, or excimer (exciplex) laser cutting machine. For example, Mitsubishi Corporation makes 5-axis computer numerical controlled laser cutting machines, such as the ML1515VZ20. In another example, Sumitomo Heavy Industries, Ltd. makes laser cutting machines, such as the KrF excimer laser INDEX-848K having a wavelength of 248 nm.

The wavelength of the laser light may vary depending upon the type of material desired to be cut. In some embodiments, the wavelength is in the ultraviolet portion of the spectrum, i.e., from about 10 nm to about 400 nm. In some embodiments, a specific portion of the ultraviolet spectrum may be selected, such as from about 200 nm to about 300 nm. For example, for many polymers, 248 nm light may be effective for cutting. In other embodiments, other portions of the electromagnetic spectrum may be selected for the laser. In some embodiments, infrared light may be selected. For example, carbon dioxide lasers in the 9,400 nm-10,640 nm wavelength range may be desirable for certain metals. In other embodiments, lasers operating at 355 nm, 532 nm, and 1064 nm may be desirable for other metals. Similarly to the selection of wavelength, the power of the laser and/or the duration of any laser pulses or exposure to laser beams may be selected depending upon such factors as the wavelength, the power source, the type of material desired to be cut, and the type of cutting desired.

The type of laser cutting machine may be selected based on a variety of factors. For example, the type of laser cutting machine may be selected based on the precision of the laser oscillator, the materials of the golf ball to be cut, the desired texture to be created by the laser, and/or the desired size and shape of the golf ball dimples. Laser cutting machine 100 may include a laser oscillator 104 configured to generate a laser. Laser oscillator 104 may include any suitable type of laser oscillator for cutting away golf ball cover material. The type of laser oscillator may be selected based on a variety of factors. For example, the type of laser oscillator may be selected based on the type of laser cutting machine used. Laser cutting machine 100 may include a power source configured to power laser oscillator 104. For example, as shown in FIG. 1, the power source may include a transformer 108. The type of power source may be selected based on a variety of factors. For example, the type of power source may be selected based on the type of laser oscillator used.

Laser cutting machine 100 may include a laser head 102. Laser head 102 may be connected to laser oscillator 104 and may be configured to focus the laser produced by laser oscillator 104. Laser head 102 may include a laser nozzle 116 disposed on the bottom of laser head 102. Laser nozzle 116 may be configured to further focus the laser and emit a laser beam. Laser nozzle 116 may be adjustable to increase and/or decrease the focus of the laser beam. In some embodiments, laser nozzle 116 may be adjusted by a user interface. The user interface is discussed in more detail below. The type of laser head and/or laser nozzle may be selected based on a variety of factors. For example, the type of laser head and laser nozzle may be selected based on the type of the laser cutting machine used and/or the desired diameter, depth, and shape of the golf ball dimples.

The workpiece holder may include any suitable type of holder. For example, as shown in FIG. 1 workpiece holder may include a workpiece table 110. The type of workpiece holder may be selected based on a variety of factors. For example, the workpiece holder may be selected based on the shape and size of workpiece to be laser cut and/or the type of laser cutting machine included in the system. As shown by the exemplary embodiment, the workpiece holder may include a workpiece holder configured to hold a golf ball. However, other embodiments of laser cutting machine 100 may be used to laser cut workpieces other than golf balls. In such embodiments, the workpiece holder may be configured to hold other types of workpieces.

Workpiece table 110 may have a holding portion. For example, in some embodiments, workpiece table 110 may have a spindle configured to hold a golf ball. In some embodiments, workpiece table 110 may have one or more pins configured to hold a golf ball by having the tips of the pins press against the golf ball on opposing sides. In some embodiments, workpiece table 110 may include an air-blowing system that levitates the ball to maintain the ball in a certain position. In some embodiments, workpiece table 110 may include vacuum suction system that uses a vacuum suction to maintain the ball in a certain position. As shown in the embodiment of FIG. 1, the workpiece holding portion of workpiece table 110 may include a first clamp 120 and a second clamp 122. First clamp 120 may include a cup shaped to contact a golf ball. The cup may be connected to a screw configured to be screwed through a plate 124. Plate 124 may have a threaded hole configured to receive the screw of first clamp 120. Second clamp 122 may include a cup shaped to contact a golf ball. The cup may be connected to a screw configured to be screwed through a plate 126. Plate 126 may have a threaded hole configured to receive the screw of second clamp 122. The cups of first clamp 120 and second clamp 122 may each have a shape corresponding to the shape of a golf ball. Accordingly, a golf ball may fit flush against the cups. To secure a base golf ball to workpiece table 110, a base golf ball 118 may be placed between first clamp 120 and second clamp 122. First clamp 120 may be twisted through the hole of plate 124 to move the cup closer to golf ball 118. Second clamp 122 may be twisted through the hole of plate 126 to move the cup closer to golf ball 118. The pressure applied to golf ball 118 by first clamp 120 and second clamp 122 may be adjusted as needed to secure golf ball 118 in place.

As discussed above, laser cutting machine 100 may include a movement system providing motion between the laser head and the workpiece. For example, as mentioned above, Mitsubishi Corporation makes 5-axis computer numerical controlled laser cutting machines, such as the ML1515VZ20. According to the embodiment shown in FIGS. 1-5, laser cutting machine 100 may include a 5-axis cutting machine configured to move the laser head in three directions and the workpiece in two directions. In some embodiments, laser cutting machine 100 may include a 5-axis cutting machine configured to move the laser head in two directions and the workpiece in three directions. In some embodiments, laser cutting machine 100 may include a 6-axis cutting machine configured to move the laser head in three directions and the workpiece in three directions. Providing multiple directions of movement between the laser head and the workpiece holder may provide many cutting pattern possibilities.

Figure 2:
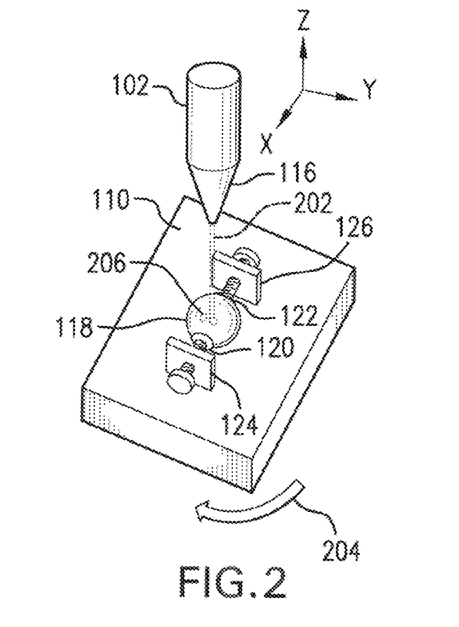
FIG. 2 is a perspective view of the laser head and workpiece table of FIG. 1 in a first position.
Figure 3:
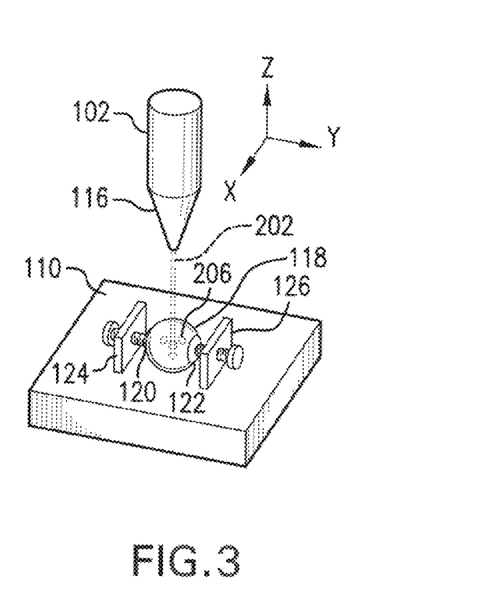
FIG. 3 is a perspective view of the laser head and workpiece table of FIG. 1 in a second position.
Figure 4:
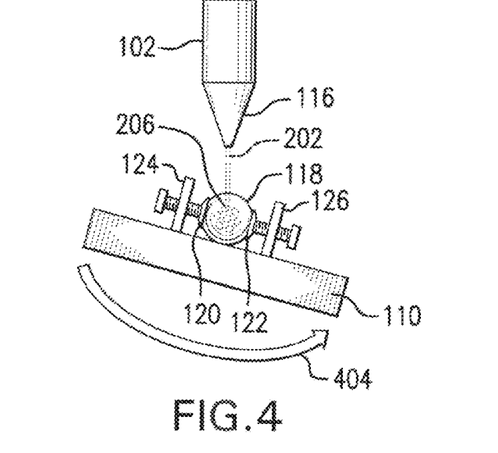
FIG. 4 is a side view of the laser head and workpiece table of FIG. 1 in a third position.
Figure 5:
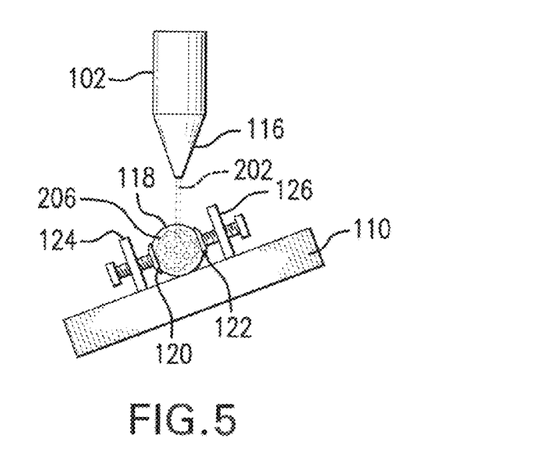
FIG. 5 is a side view of the laser head and workpiece table of FIG. 1 in a fourth position.

As shown in FIG. 1, laser cutting machine 100 may include workpiece table 110. Workpiece table 110 may be configured move a workpiece during laser cutting. FIGS. 2-5 demonstrate how workpiece table 110 may be pivotable in two directions. FIG. 2 is a perspective view of laser head 102 and workpiece table 110 of FIG. 1 in a first position. FIG. 3 is a perspective view of laser head 102 and workpiece table 110 of FIG. 1 in a second position. As indicated by an arrow 204 in FIG. 2, workpiece table 110 may be pivoted about the z-axis. FIGS. 2 and 3 demonstrate how workpiece table 110 may be pivoted from the first position shown in FIG. 2 in the direction indicated by arrow 204 to the second position shown in FIG. 3. Correspondingly, workpiece table 110 may be pivoted in the opposite direction about the z-axis. FIG. 4 is a side view of laser head 102 and workpiece table 110 of FIG. 1 in a third position. FIG. 5 is a side view of laser head 102 and workpiece table 110 of FIG. 1 in a fourth position. As indicated by an arrow 404 in FIG. 4, workpiece table 110 may be pivoted about the x-axis. FIGS. 4 and 5 demonstrate how workpiece table 110 may be pivoted from the third position shown in FIG. 4 in the direction indicated by arrow 404 to the fourth position shown in FIG. 5. Correspondingly, workpiece table 110 may be pivoted in the opposite direction about the x-axis. In some embodiments, workpiece table 110 may be linearly moveable in place of or in addition to being pivotably moveable. For example, workpiece table may be linearly moveable in directions parallel to the x-axis, y-axis, and/or z-axis.

In some embodiments, laser head 102 may be linearly moveable in directions parallel to the x-axis, y-axis, and/or z-axis shown in FIGS. 2 and 3. For example, laser head 102 may be moved along the z-axis toward and away from workpiece table 110, Laser head 102 may be moved along the x-axis and y-axis to reposition laser head 102 with respect to the workpiece held by workpiece table 110. In some embodiments, laser head 102 may be pivotably moveable in place of or in addition to being linearly moveable.

FIGS. 2-5 demonstrate how laser head 102 may emit a laser beam 202 that cuts dimples 206. As discussed above, laser head 102 and/or workpiece table 110 may be moved as laser beam 202 removes material from the cover of golf ball 118. Moving laser head 102 and/or workpiece table 110 may cause laser beam 202 to remove material from the cover of golf ball 118 in a pattern based on the relative movement between laser head 102 and workpiece table 110. The relative movement between laser head 102 and workpiece table 110 and the focus of laser beam 202 may be configured to form various patterns on a golf ball. For example, in some embodiments, the relative movement between laser head 102 and workpiece table 110 and the focus of laser beam 202 may be set to form dimples in the cover of golf ball 118.

The laser beam emitted from laser head 102 may be adjusted to leave the surface of a golf ball smooth after cutting. Correspondingly, the laser beam emitted from laser head 102 may be adjusted to leave marks in the wake of the laser beam. The marks resulting from laser cutting may be so subtle and uniform that the roughness of the surface of the golf ball may be extremely low. In some embodiments, laser cutting machine 100 may be used to cut closely-spaced fine lines and/or other repeated patterns that add texture to the surface of the golf ball such that the surface of the golf ball is rougher.

As discussed above, laser cutting machine 100 may include a computer numerical controller 112 configured to control the movement between the laser head and the workpiece. For example, as mentioned above, Mitsubishi Corporation makes 5-axis computer numerical controlled laser cutting machines, such as the ML1515VZ20. In some embodiments, computer numerical controller 112 may be configured to control the focus of the laser beam emitted from laser head 102. The computer numerical controller may include any suitable type of computer numerical controller. The type of computer numerical controller may be selected based on a variety of factors. For example, the type of computer numerical controller may be selected based on the type of laser head and/or type of workpiece table used.

Laser cutting machine 100 may include a user interface 106. User interface 106 may include any suitable type of user interface through which a user may control the laser head and/or the computer numerical controller. For example, user interface 106 may include a panel on one of the components of laser cutting machine 100 that is linked to a processor and a memory. In some embodiments, user interface 106 may include a personal computer. The type of user interface used may be selected based on a variety of factors. For example, the type of user interface used may be selected based on the type of laser head and/or the type of computer numerical controller used. In some embodiments, user interface 106 may be configured to program computer numerical controller 112. In some embodiments, user interface 106 may be configured to enable a user to control the laser produced by laser oscillator 104 and/or the laser beam emitted from laser head 102. User interface 106 may include multiple user interfaces. For example, a first user interface may be configured to enable a user to control the laser beam emitted from laser head and a second user interface may be configured enable a user to control the computer numerical controller.

Figure 6:
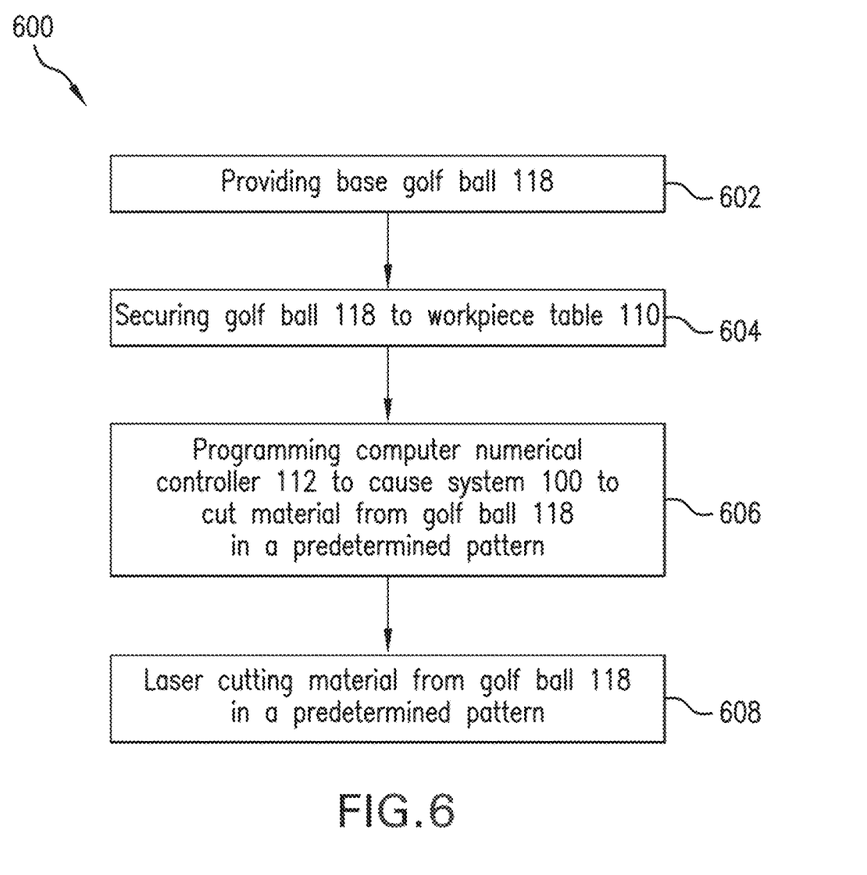
FIG. 6 is an exemplary method of making a golf ball according to an embodiment.

FIG. 6 includes an exemplary embodiment of the disclosed method 600. Method 600 may include steps 602, 604, 606, and 608. Step 602 may include providing base golf ball 118 to be laser cut. Step 604 may include securing golf ball 118 to workpiece table 110. Step 606 may include programming computer numerical controller 112 to cause laser cutting machine 100 to cut material from the cover of golf ball 118 in a predetermined pattern. Step 608 may include laser cutting material from the cover of golf ball 118 in a predetermined pattern.

As discussed above, the base golf ball upon which dimples are to be formed or adjusted may include any type of golf ball. In some embodiments, the base golf ball may include a 1-piece, 2-piece, 3-piece, or 4-piece golf ball. In other embodiments, the base golf ball may include 5 or more layers. Step 602 may include providing base golf ball 118 to be laser cut. Providing a base golf ball 118 may include making base golf ball 118. Step 602 may include forming the layers of a golf ball by any suitable process. For example, in some embodiments, step 602 may include compression molding a core, placing the core in a hemispherical mold having smooth surfaces, and injection molding cover material around the core. In some embodiments, step 602 may include injection molding a core, placing the core in a hemispherical mold having smooth surfaces, and injection molding cover material around the core. In other embodiments, step 602 may include compression molding an inner core, compression molding an outer core surrounding the inner core, and injection molding cover material around the inner core. In some embodiments, step 602 may include molding an outer surface of the golf ball to include dimples. In some embodiments, step 602 may include molding an outer surface of the golf ball to be smooth without dimples. In some embodiments, the base golf ball may have a larger diameter than the diameter of the finished golf ball. A larger diameter may allow for material to be removed through laser cutting during step 608 to arrive at the diameter of the finished golf ball.

As stated above, step 604 may include securing golf ball 118 to workpiece table 110. Step 604 may be achieved by placing a golf ball 118 between first clamp 120 and second clamp 122 of workpiece table 110. First clamp 120 and second clamp 122 may be moved toward golf ball 118 to secure golf ball 118 by each clamping against golf ball 118 on two opposing sides. To move toward golf ball 118, first clamp 120 may be twisted to move the screw within first plate 124 and second clamp 122 may be twisted to move the screw within second plate 126. In other embodiments, laser cutting machine 100 may include other types of workpiece holders configured to secure a golf ball. In such embodiments, step 604 may be carried out in a manner suitable to secure golf ball 118 to the workpiece holder. For example, laser cutting machine 100 may include a spindle for holding a base golf ball and step 604 may include securing a golf ball within the spindle. In another embodiment, workpiece table 110 may have one or more pins configured to hold a golf ball by having the tips of the pins press against the golf ball on opposing sides. In some embodiments, workpiece table 110 may include an air-blowing system that levitates the ball to maintain the ball in a certain position.

As stated above, step 606 may include programming computer numerical controller 112 to cause laser cutting machine 100 to laser cut material from the cover of golf ball 118 in a predetermined pattern. A user may use user interface 106 to program computer numerical controller 112 to move workpiece table 110 and/or laser head 102 in the predetermined path to laser cut material from the cover of golf ball 118 in a predetermined pattern. Step 606 may further include setting laser head 102 to focus laser beam 202 at a predetermined setting to achieve a certain texture or to cut a certain dimple shape. The predetermined setting may depend upon the predetermined pattern and/or the type of material to be cut away from the golf ball. A user may use user interface 106 to set laser head 102 to focus laser beam 202 at the predetermined setting. In some embodiments, user may use user interface 106 to select a power level for laser oscillator 104 to power laser head 102 with. The power level may determine the focus of laser beam 202 emitted by laser head 102. Consequently, the focus of laser beam 202 may correspond with the amount of cover material cut away by laser beam 202.

As stated above, step 608 may include cutting material from the cover of golf ball 118 in a predetermined pattern. Laser cutting machine 100 may perform step 608. To perform step 608, computer numerical controller 112 may cause laser head 102 and/or workpiece table 110 to move in a predetermined path while laser head 102 emits a laser beam that cuts material from the outer surface of golf ball cover layer. The predetermined path may be selected to cause a certain relative movement between laser head 102 and workpiece table 110. Laser beam 202 may remove material from the cover of golf ball 118 in a pattern based on the relative movement between laser head 102 and workpiece table 110. The relative movement between laser head 102 and workpiece table 110 and the focus of laser beam 202 may be configured to form various patterns on golf ball 118. For example, in some embodiments, the relative movement between laser head 102 and workpiece table 110 and the focus of laser beam 202 may be set to form dimples in the cover of golf ball 118. In this case, the relative movement between laser head 102 and workpiece table 110 may cause the laser beam to move across the cover of golf ball 118 in the areas in which dimples are to be formed. FIGS. 2-6 demonstrate laser beam 202 cutting dimples 206 on golf ball 118 as workpiece table 110 is moved in different positions. Step 608 may include adjusting the amount of material cut from areas of the golf ball by decreasing or increasing the strength of the laser beam, or even turning off the laser beam, depending on the position of the laser head 102 relative to the golf ball.

As discussed above, in some embodiments, laser cutting machine 100 may be used to cut closely-spaced fine lines and/or other repeated patterns that add a textured pattern to the surface of the golf ball such that the surface of the golf ball is rougher. In some embodiments, relative movement between laser head 102 and workpiece table 110 and the focus of laser beam 202 may be set to texturize the cover of golf ball 118. For example, the cover of golf ball 118 may be cut in a textured pattern including only the dimples, only the land area between dimples, or the entire surface of the golf ball. In the case that laser cutting machine 100 texturizes the entire golf ball, the relative movement between laser head 102 and workpiece table 110 may be set to keep laser head 102 moving at a constant distance from the golf ball to cut away material evenly from the entire surface of the golf ball.

Figure 7:
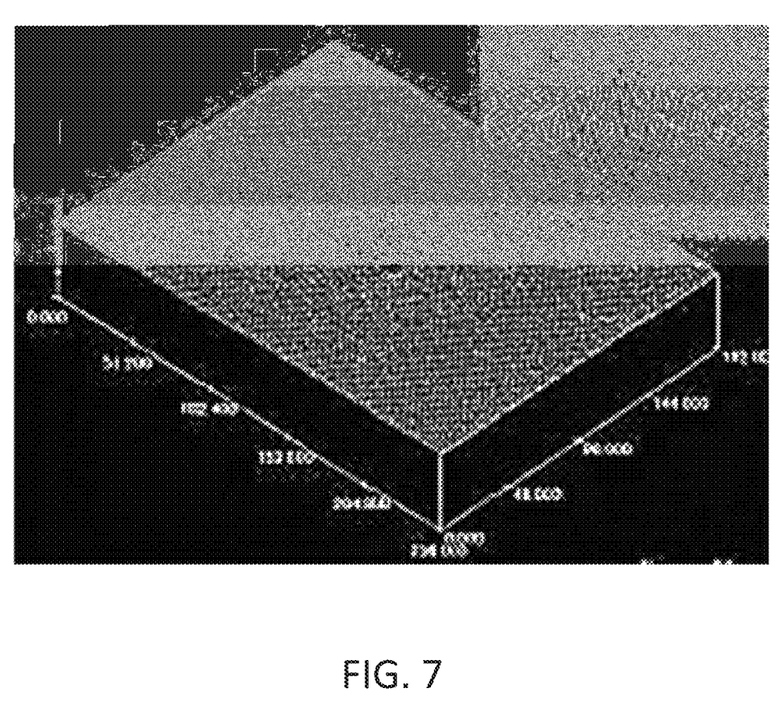
FIG. 7 is an image of polymide plate after material has been removed by laser cutting.
Figure 8:
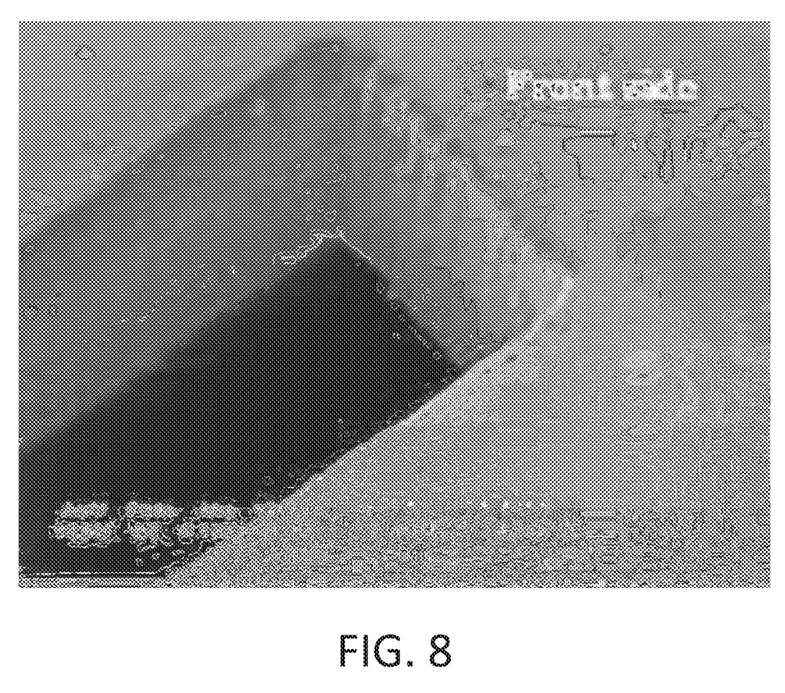
FIG. 8 is a detailed view of the laser cut area of the polymide plate.

FIGS. 7 and 8 demonstrate the results of laser cutting a plate made of polymide, a common golf ball cover material. FIG. 7 is an image of polymide plate after material has been removed by laser cutting and a detailed view of the microtexturizing resulting from laser cutting. FIG. 8 is a detailed view of the laser cut area of the polymide plate. The plate is 0.124 mm and the divot left from laser cutting material from the plate has a depth of 35 microns (0.035 mm). The range of error is about 1 micron (0.001 mm). The plate was laser cut with a Spectra-Physics Navigator II YHP40 laser system made by Spectra-Physics, a Newport Corporation brand. The laser system has a wavelength of 355 nm and a frequency of 20 kHz. 100 passes were made with the laser to cut away the material. Similar techniques may be used to remove material from the cover of a golf ball to texturize the surface of the golf ball and/or create dimples on the cover of the golf ball.

The disclosed system and method may have many applications. For example, the disclosed system and method may be used during research and development to test different types of aerodynamic patterns. During testing of different types of aerodynamic patterns, the system and method may be used to add or modify dimples to a pre-made golf ball. During testing of different types of aerodynamic patterns, the system and method may be used to add or modify dimples to a testing golf ball. For example, testing golf balls may include those described in U.S. patent application Ser. No. 12/958,843, entitled Systems and Methods for Evaluating a Golf Ball Design, applied for by Fitchett and filed on Dec. 2, 2010, the disclosure of which is hereby incorporated by reference in its entirety.

In some applications, the system and method may be used during manufacture. For example, in some applications, a certain product may be produced by using the disclosed system and method. In some applications, the system and method may be used to finish a golf ball with a customized dimple pattern selected by the customer. In some applications, the system and method may be used by a retailer for ball fitting analysis. For example, the system and method may be used for the ball fitting analysis method disclosed in U.S. Patent Application Publication Number 2011/0009215, entitled Method and System for Golf Ball Fitting Analysis, applied for by Ichikawa and published on Jan. 13, 2011, the disclosure of which is hereby incorporated by reference in its entirety.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and theft equivalents. Also, various modifications and changes may be made within the scope of the attached claims.

What is claimed is:

1. A method comprising:
providing a golf ball including a core and a cover layer surrounding the core;
laser cutting material from the cover layer of the golf ball to form a first predetermined dimple pattern, wherein laser cutting material from the outer layer does not cut material from any other layers of the golf ball;
testing the golf ball to determine a first aerodynamic property corresponding to the first predetermined dimple pattern;
laser cutting material from the cover of the golf ball having the first predetermined dimple pattern to form a second predetermined dimple pattern; and
testing the golf ball to determine a second aerodynamic property corresponding to the second predetermined dimple pattern.

2. A method comprising:
forming a golf ball core;
forming a golf ball cover surrounding the golf ball core; and
laser cutting material from the golf ball cover to form a first predetermined pattern;
testing the first predetermined pattern to determine at least one of a first coefficient of lift and a first coefficient of drag;
laser cutting material from the golf ball cover to form a second predetermined pattern; and
testing the second predetermined pattern to determine at least one of a second coefficient of lift and a second coefficient of drag.

3. The method of making a golf ball according to claim 2, wherein forming a golf ball cover surrounding the golf ball core comprises:
placing the golf ball core between at least two mold chambers;
pressing the at least two mold chambers together; and injecting a golf ball cover material into the mold chambers.

4. The method of making a golf ball according to claim 3, wherein the first predetermined pattern includes a dimple pattern.

5. The method of making a golf ball according to claim 3, wherein the first predetermined pattern includes a textured pattern.

6. The method of claim 1, wherein the first aerodynamic property includes at least one of a first coefficient of lift and a first coefficient of drag; and
wherein the second aerodynamic property includes at least one of a second coefficient of lift and a second coefficient of drag.

7. The method of claim 1, wherein laser cutting material from the cover layer of the golf ball to form a first predetermined dimple pattern and laser cutting material from the cover of the golf ball to form a second predetermined dimple pattern each respectively include:
    exposing the cover layer of the golf ball to laser light; and
    wherein the laser light has a wavelength of from about 10 nm to about 400 nm.

8. The method of claim 7, wherein the laser light has a wavelength of from about 200 nm to about 300 nm.

9. The method of claim 1, wherein testing the golf ball to determine a first aerodynamic property and testing the golf ball to determine a second aerodynamic property each respectively include placing the golf ball in a moving fluid.

10. The method of claim 1, laser cutting material from the cover of the golf ball having the first predetermined dimple pattern to form a second predetermined dimple pattern includes making at least one dimple of the first predetermined dimple pattern larger or deeper.

11. The method of claim 2, laser cutting material from the golf ball cover to form a first predetermined pattern and laser cutting material from the golf ball cover to form a second predetermined pattern each respectively include:
    exposing the golf ball cover to laser light; and
    wherein the laser light has a wavelength of from about 10 nm to about 400 nm.

12. The method of claim 11, wherein the laser light has a wavelength of from about 200 nm to about 300 nm.

13. The method of claim 2, wherein testing the first predetermined pattern, and testing the second predetermined pattern each respectively include exposing the golf ball cover to a moving fluid.

14. The method of claim 4, wherein laser cutting material from the golf ball cover to form a second predetermined pattern includes making at least one dimple of the dimple pattern larger or deeper.

* * * * *